US012138917B2

(12) United States Patent
Kogame

(10) Patent No.: US 12,138,917 B2
(45) Date of Patent: Nov. 12, 2024

(54) HEAD MODULE, HEAD SYSTEM, LIQUID DISCHARGE APPARATUS, AND METHOD FOR DETERMINING DELAY TIME

(71) Applicant: BROTHER KOGYO KABUSHIKI KAISHA, Nagoya (JP)

(72) Inventor: Yuji Kogame, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 179 days.

(21) Appl. No.: 17/811,465

(22) Filed: Jul. 8, 2022

(65) Prior Publication Data

US 2023/0008325 A1 Jan. 12, 2023

(30) Foreign Application Priority Data

Jul. 12, 2021 (JP) ................................ 2021-115215

(51) Int. Cl.
*B41J 2/045* (2006.01)

(52) U.S. Cl.
CPC ....... *B41J 2/04573* (2013.01); *B41J 2/04586* (2013.01)

(58) Field of Classification Search
CPC ........................ B41J 2/04573; B41J 2/04586; B41J 2/04505; B41J 2202/20
See application file for complete search history.

(56) References Cited

U.S. PATENT DOCUMENTS

| | | | |
|---|---|---|---|
| 2010/0073416 A1 | 3/2010 | Yokota | |
| 2016/0059548 A1 | 3/2016 | Tuttnauer et al. | |
| 2017/0334192 A1 | 11/2017 | Iida | |
| 2019/0283447 A1* | 9/2019 | Yokozawa | G06T 7/0004 |

FOREIGN PATENT DOCUMENTS

| | | | |
|---|---|---|---|
| EP | 3 539 784 | A1 | 9/2019 |
| JP | 2007-69428 | A | 3/2007 |
| JP | 2009-184142 | A | 8/2009 |
| JP | 2009-241379 | A | 10/2009 |
| JP | 2010076142 | A | 4/2010 |

(Continued)

OTHER PUBLICATIONS

Notice of Reasons for Refusal dated Jan. 9, 2024 from related Japanese Patent Application No. 2021-115215 together with English language translation.

*Primary Examiner* — Thinh H Nguyen
(74) *Attorney, Agent, or Firm* — Scully, Scott, Murphy & Presser, PC

(57) ABSTRACT

A head module includes: a first control circuit; a first head having first nozzles configured to discharge liquid, the first head being electrically connected to the first control circuit; and a sensor electrically connected to the first control circuit and configured to detect an image formed on a recording medium. The first head has a first nozzle surface extended in a first direction and a second direction intersecting with the first direction, and the first nozzle surface includes a first region in which the first nozzles are formed along the first direction. The sensor includes a light-receiving element which has a light-receiving surface extended in the first direction and the second direction. In the first direction, a position of the light-receiving element is same as a position of the first region.

13 Claims, 11 Drawing Sheets

(56) References Cited

FOREIGN PATENT DOCUMENTS

| | | | |
|---|---|---|---|
| JP | 2010076147 | A | 4/2010 |
| JP | 2010-115783 | A | 5/2010 |
| JP | 2011-178100 | A | 9/2011 |
| JP | 2019-155747 | A | 9/2019 |
| WO | 2016/093008 | A | 6/2016 |

* cited by examiner

HEAD MODULE, HEAD SYSTEM, LIQUID DISCHARGE APPARATUS, AND METHOD FOR DETERMINING DELAY TIME

CROSS REFERENCE TO RELATED APPLICATIONS

The present application claims priority from Japanese Patent Application No. 2021-115215, filed on Jul. 12, 2021, the disclosure of which is incorporated herein by reference in its entirety.

BACKGROUND

The present technology relates to a head module, a head system, and a liquid discharge apparatus that discharge liquid, and to a method for determining delay time for discharging liquid from the head module.

There is known a liquid droplet discharge device in which a main controller and a plurality of head control boards (hereafter, HC boards) is daisy-chained. The plurality of HC boards respectively controls a plurality of ink jet heads. In this liquid droplet discharge device, a different delay amount is determined for each of the HC boards, synchronization is implemented based on the delay amounts, and discharge from nozzles is synchronized, whereby printing is performed at a desired position.

SUMMARY

In a case that an ink jet head is attached to a designated position of the liquid droplet discharge device, an attachment position of the ink jet head will be sometimes shifted. The above-mentioned delay amount is the delay amount in a case of there being no shift in the attachment position, and an ink jet head whose attachment position has been shifted will not be able to print at the desired position even when synchronization is implemented based on the delay amounts. In other words, shift of printing position will occur.

The plurality of ink jet heads is aligned in a daisy chain connecting direction, that is, a printing width direction. Conceivably, in order to prevent the above-mentioned shift of printing position, a dedicated sensor covering an entire printing width will be provided, an image formed by the plurality of ink jet heads will be scanned by said sensor, and discharge timepoints of each of the plurality of ink jet heads will be corrected. However, in the case of a dedicated sensor being manufactured, costs will mount.

The present disclosure, which was made in view of such circumstances, relates to a head module, a head system, a liquid discharge apparatus, and a method for determining delay time, that can detect shift of printing position of each of a plurality of head modules without a dedicated sensor covering an entire printing width being provided.

According to a first aspect of the present teaching, there is provided a head module including:

a first control circuit;

a first head having a plurality of first nozzles configured to discharge liquid, the first head being electrically connected to the first control circuit; and a sensor electrically connected to the first control circuit and configured to detect an image formed on a recording medium, wherein the first head has a first nozzle surface extended in a first direction and a second direction intersecting with the first direction, the first nozzle surface includes a first region in which the first nozzles are formed along the first direction, the sensor includes a light-receiving element which has a light-receiving surface extended in the first direction and the second direction, and in the first direction, a position of the light-receiving element is same as a position of the first region.

According to a second aspect of the present teaching, there is provided a head system including two of the head modules according to the first aspect of the present teaching, wherein the first control circuit of one of the head modules and the first control circuit of the other of the head modules are serially connected, the other of the head modules further has a third head having a plurality of third nozzles configured to discharge the liquid, the third head being electrically connected to the first control circuit of the other of the head modules, the third head has a third nozzle surface extended in the first direction and the second direction, the third nozzle surface includes a third region in which the third nozzles are formed along the first direction, and in the first direction, the position of the light-receiving element of the one of the head modules is same as a position of the third region of the other of the head modules.

According to a third aspect of the present teaching, there is provided a head system including a plurality of head modules, wherein each of the head modules includes:

a control circuit;

a first head electrically connected to the control circuit and having a plurality of first nozzles configured to discharge liquid;

a second head electrically connected to the control circuit and having a plurality of second nozzles configured to discharge the liquid; and a sensor electrically connected to the control circuit and configured to detect an image formed on a recording medium, for each of the head modules, the first head has a first nozzle surface extended in a first direction and a second direction intersecting with the first direction, the first nozzle surface includes a first region in which the first nozzles are formed along the first direction, the sensor includes a light-receiving element which has a light-receiving surface extended in the first direction and the second direction, in the first direction, a position of the light-receiving element is same as a position of the first region, the second head has a second nozzle surface extended in the first direction and the second direction, the second nozzle surface includes a second region in which the second nozzles are formed along the first direction, in the first direction, the position of the light-receiving element is different from a position of the second region, control circuits included in the head modules respectively are serially connected, an adjacent two of the head modules whose control circuits have been serially connected are a $k^{th}$ head module and a $k+1^{th}$ head module (where k is a natural number), the $k+1^{th}$ head module further has a third head having a plurality of third nozzles configured to discharge the liquid, the third head being electrically connected to the control circuit of the k+1$^{th}$ head module, the third head has a third nozzle surface extended in the first direction and the second direction, the third nozzle surface includes a third region in which the third nozzles are formed along the first direction, in the first direction, a position of the third region of the k+1$^{th}$ head module is same as a position of the first region of the k$^{th}$ head module, the control circuit of the k$^{th}$ head module is configured to receive print data, and, at a first timepoint after receiving the print data, cause the liquid to be discharged from the first nozzles positioned in the first region of the k$^{th}$ head module and transfer the print data to the control circuit of the k+1$^{th}$ head module, the control circuit of the k+1$^{th}$ head module is configured to cause the liquid to be discharged from the third nozzles positioned in the third region of the k+1$^{th}$ head module, at a second timepoint later than the first timepoint, the control circuit of the k$^{th}$ head module is configured to cause the sensor of the k$^{th}$ head module to detect a first image and a second image formed on the recording medium, the first image being formed by the liquid that has been discharged from the first nozzles of the k$^{th}$ head module and the second image being formed by the liquid that has been discharged from the third nozzles of the k+1$^{th}$ head module, and the control circuit of the k$^{th}$ head module is configured to:

calculate a positional-shift delay time caused by positional-shift of the k$^{th}$ head module and k+1$^{th}$ head module, based on the first image and the second image that have been detected, transmit the positional-shift delay time that has been calculated to the control circuit of each of the head modules other than the k$^{th}$ head module, receive the positional-shift delay time that has been calculated by the control circuit of each of the head modules other than the k$^{th}$ head module, from the control circuit of each of the head modules other than the k$^{th}$ head module, acquire a transfer delay time caused by transfer of the print data, and determine a discharge delay time from the receipt of the print data by the control circuit of the k$^{th}$ head module to the discharge of the liquid from the first nozzles of the k$^{th}$ head module, based on the positional-shift delay time and the transfer delay time.

According to a fourth aspect of the present teaching, there is provided a liquid discharge apparatus including:

the head module according to the first aspect of the present teaching or the head system according to the second or third aspect of the present teaching; and a conveyor configured to convey the recording medium.

According to a fifth aspect of the present teaching, there is provided a method for determining delay time executed by the head system according to the second aspect of the present teaching, the head system including a main control circuit electrically connected to the first control circuit of each of the head modules, the method including:

transmitting print data to the first control circuit of the one of the head modules from the main control circuit;

causing the liquid to be discharged from the first nozzles positioned in the first region of the one of the head modules and transferring the print data to the first control circuit of the other of the head modules, at a first timepoint after receiving the print data by the first control circuit of the one of the head modules;

causing the liquid to be discharged from the third nozzles positioned in the third region of the other of the head modules, at a second timepoint later than the first timepoint;

causing the sensor of the one of the head modules to detect a first image and a second image formed on the recording medium, the first image being formed by the liquid that has been discharged from the first nozzles of the one of the head modules and the second image being formed by the liquid that has been discharged from the third nozzles of the other of the head modules;

determining a positional-shift delay time by means of the first control circuit of the one of the head modules, based on the first image and the second image that have been detected, the positional-shift delay time being caused by positional-shift of the one and the other of the head modules;

acquiring a transfer delay time caused by transfer of the print data, by means of the first control circuit of the one of the head modules; and determining a discharge delay time by means of the first control circuit of the one of the head modules, based on the positional-shift delay time and the transfer delay time, the discharge delay time being a time from the receipt of the print data by the first control circuit of the one of the head modules to the discharge of the liquid from the first nozzles of the one of the head modules.

According to a sixth aspect of the present teaching, there is provided a method for determining delay time of a head system having a plurality of head modules, each of the head modules including:

a control circuit;

a first head electrically connected to the control circuit and having a plurality of first nozzles configured to discharge liquid;

a second head electrically connected to the control circuit and having a plurality of second nozzles configured to discharge the liquid; and a sensor electrically connected to the control circuit and configured to detect an image formed on a recording medium, the first head having a first nozzle surface extended in a first direction and a second direction intersecting with the first direction, the first nozzle surface including a first region in which the first nozzles are formed along the first direction, the sensor including a light-receiving element which has a light-receiving surface extended in the first direction and the second direction, in the first direction, a position of the light-receiving element being same as a position of the first region, the second head having a second nozzle surface extended in the first direction and the second direction, the second nozzle surface including a second region in which the second nozzles are formed along the first direction, in the first direction, the position of the light-receiving element being different from a position of the second region, control circuits included in the head modules respectively being serially connected, an adjacent two of the head modules whose control circuits have been serially connected being a k$^{th}$ head module and a k+1$^{th}$ head module (where k is a natural number), the k+1$^{th}$ head module further has a third head having a plurality of third nozzles configured to discharge the liquid, the third head being electrically connected to the control circuit of the k+1$^{th}$ head module, the third head has a third nozzle surface extended in the first direction and the second direction, the third nozzle surface includes a third region in which the third nozzles are formed along the first direction, in the first direction, a position of the third region of the k+1$^{th}$ head module being same as the position of the first region of the k$^{th}$ head module, being the same, the method including:

causing the liquid to be discharged from the first nozzles in the first region of the k$^{th}$ head module and transferring print data from the control circuit of the k$^{th}$ head module to the control circuit of the k+1$^{th}$ head module, at a first timepoint after receiving the print data by the control circuit of the k$^{th}$ head module;

causing the liquid to be discharged from the third nozzles in the third region of the k+1$^{th}$ head module, at a second timepoint later than the first timepoint;

causing the sensor of the k$^{th}$ head module to detect a first image and a second image formed on the recording medium, the first image being formed by the liquid that has been discharged from the first nozzles of the k$^{th}$ head module and the second image being formed by the liquid that has been discharged from the third nozzles of the k+1$^{th}$ head module;

calculating a positional-shift delay time based on the first image and the second image that have been detected, by means of the control circuit of the k$^{th}$ head module, the positional-shift delay time being caused by positional-shift of the k$^{th}$ head module and k+1$^{th}$ head module;

transmitting the positional-shift delay time that has been calculated to the control circuit of each of the head modules other than the k$^{th}$ head module;

receiving the positional-shift delay time that has been calculated by the control circuit of each of the head modules other than the k$^{th}$ head module, from the control circuit of each of the head modules other than the k$^{th}$ head module;

acquiring a transfer delay time caused by transfer of the print data; and determining a discharge delay time based on the positional-shift delay time and the transfer delay time, the discharge delay time being a time from the receipt of the print data by the control circuit of the k$^{th}$ head module to the discharge of the liquid from the first nozzles of the k$^{th}$ head module.

In the head module, head systems, liquid discharge apparatus, and methods of determining delay time according to the above-mentioned aspects of the present teaching, one head module comprises one sensor. Moreover, in a first direction, a position of a light-receiving element of the sensor is same as a position of a first region where a plurality of first nozzles of a first nozzle surface is formed. Therefore, each head module can detect shift of printing position by using the sensor, and there is no need to provide a dedicated sensor covering an entire printing width.

DETAILED DESCRIPTION

Figure 1:
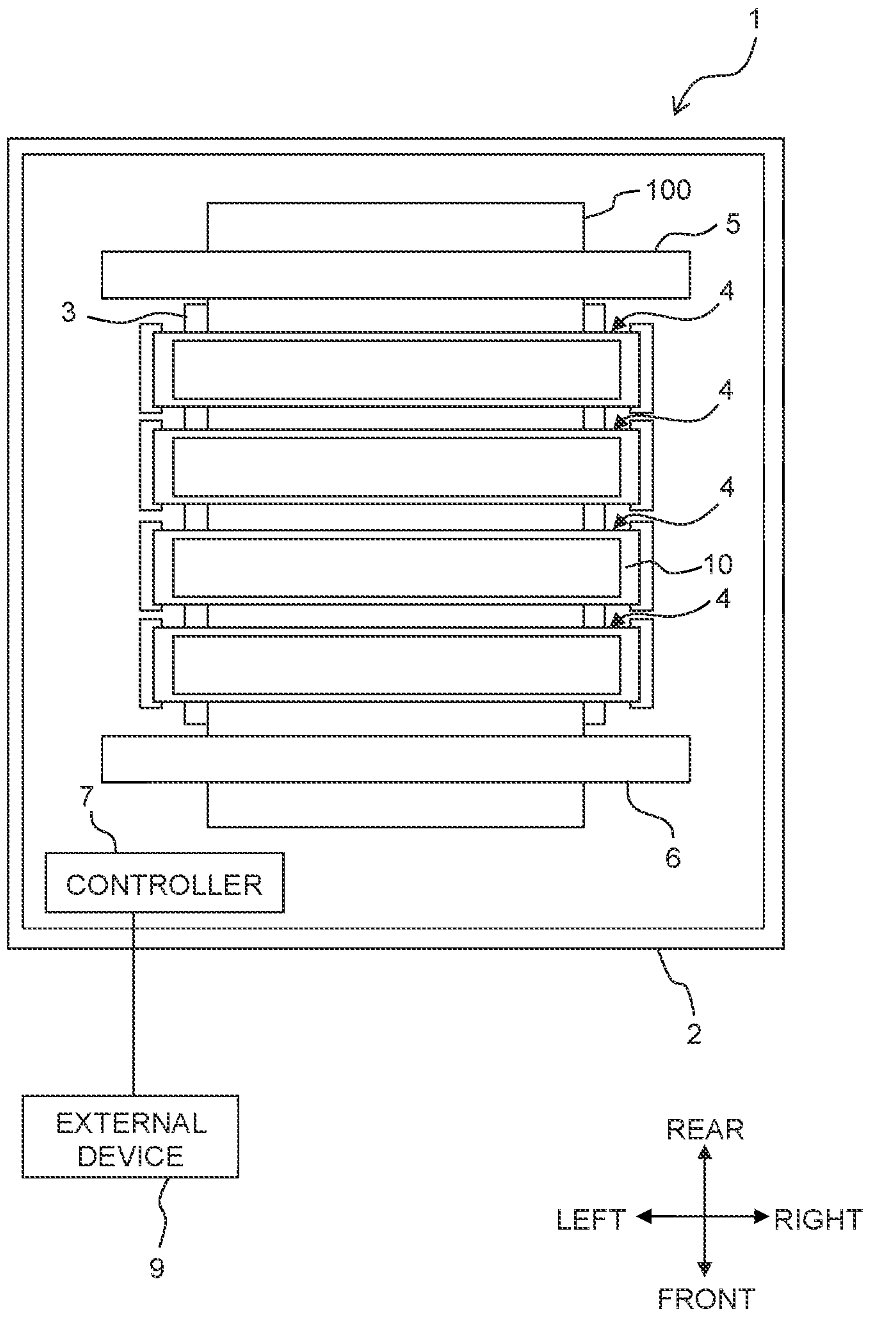
FIG. 1 is a schematic plan view of a printer.

A printer according to an embodiment of the present teaching will be described below based on the drawings. In FIG. 1, a conveying direction of a recording sheet 100 corresponds to a front-rear direction of a printer 1. Moreover, a width direction of the recording sheet 100 corresponds to a left-right direction of the printer 1. Moreover, a direction orthogonal to the front-rear direction and left-right direction, that is, a direction perpendicular to a paper surface of FIG. 1 corresponds to an up-down direction of the printer 1. The left-right direction corresponds to a first direction, and the front-rear direction corresponds to a second direction. The printer 1 corresponds to a liquid discharge apparatus.

As depicted in FIG. 1, the printer 1 comprises the likes of a platen 3 housed within a case 2, four ink jet heads 4, two conveying rollers 5, 6, and a controller 7. The conveying rollers 5, 6 correspond to a conveyor.

The recording sheet 100 passes over an upper surface of the platen 3. The four ink jet heads 4 are aligned in the conveying direction above the platen 3. Each of the ink jet heads 4 is a so-called line-type head. The ink jet head 4 has ink supplied to it from an ink tank (not illustrated). The four ink jet heads 4 are supplied with inks of different colors.

As depicted in FIG. 1, the two conveying rollers 5, 6 are respectively disposed on a rear side and front side of the platen 3. The two conveying rollers 5, 6, which are each driven by an unillustrated motor, convey frontwards the recording sheet 100 on the platen 3.

The controller 7 comprises the likes of an FPGA, an EEPROM, and a RAM. Note that the controller 7 may comprise the likes of a CPU or an ASIC. The controller 7, which is data-communicably connected to an external device 9 such as a PC, controls each section of the printer 1 based on print data sent from the external device 9.

Figure 2:
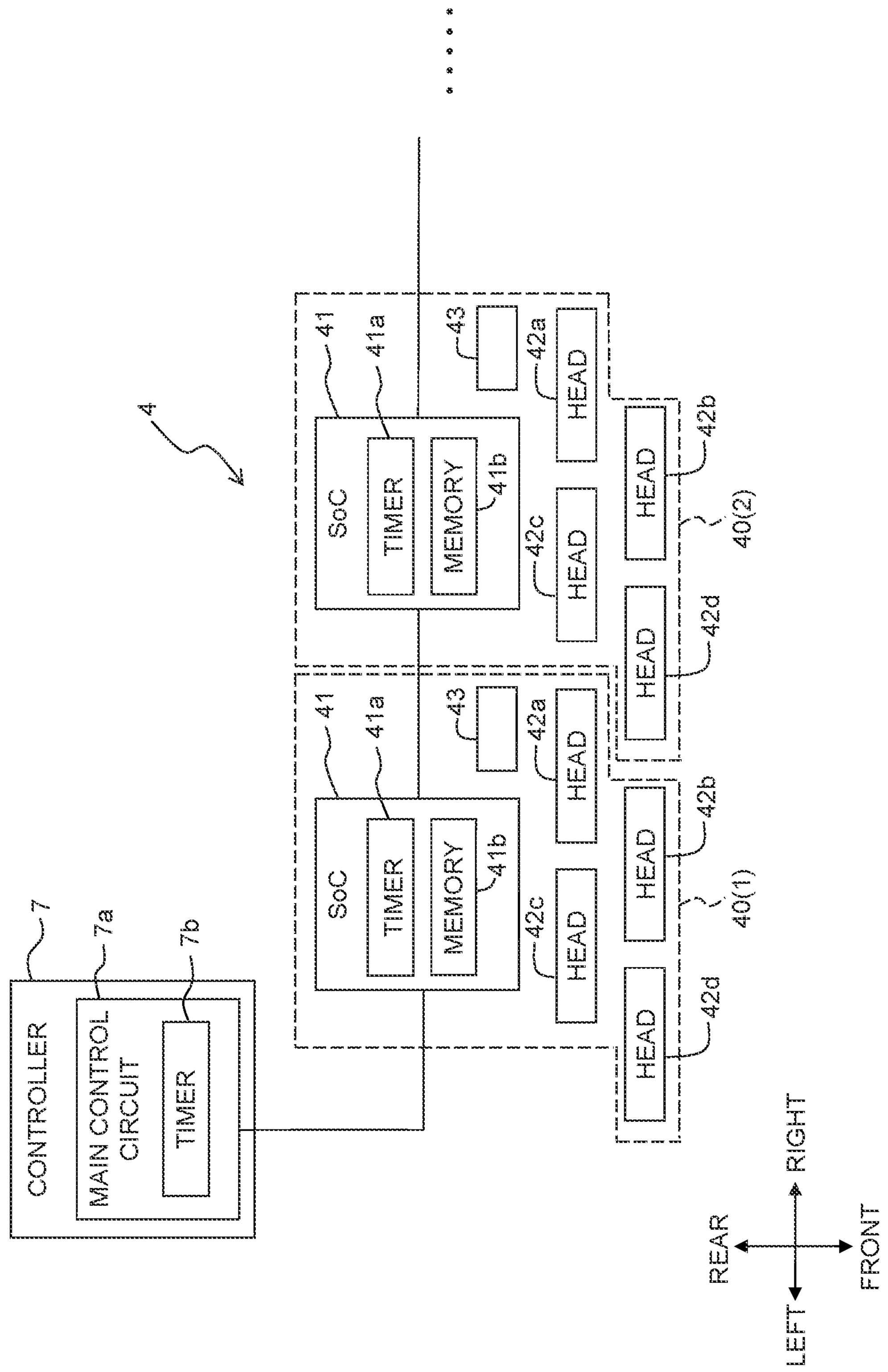
FIG. 2 is a schematic plan view of a controller and an ink jet head.

As depicted in FIG. 2, the controller 7 comprises a main control circuit 7_a_. The main control circuit 7_a_ comprises a timer 7_b_. The ink jet head 4 comprises a plurality of head modules 40. The plurality of head modules 40 is arranged in a line in the left-right direction. Each of the head modules 40 comprises: an SoC 41; a head 42_a_ (an exemplary first head); a head 42_b_ (an exemplary second head); a head 42_c_; a head 42_d_ (an exemplary third head); and a sensor 43 having a light-receiving element. The SoC 41 corresponds to a first control circuit. The SoC 41 has a timer 41*a* and a memory 41*b*.

Respective SoCs 41 of the plurality of head modules 40 are serially connected. The SoC 41 of the head module 40 positioned furthest to the left is connected to the main control circuit 7*a*. The head 42*b* is positioned to the right of the head 42*d*. The head 42*a* and the head 42*c* are disposed more to a rear side than the head 42*b* and the head 42*d*. The head 42*a* is positioned to the right of the head 42*c*.

In the left-right direction, the head 42*c* is positioned between the head 42*b* and the head 42*d*. In the left-right direction, a position of a left part of the head 42*c* is substantially the same as that of a right part of the head 42*d*, and a position of a right part of the head 42*c* is substantially the same as that of a left part of the head 42*b*. In the left-right direction, a position of a left part of the head 42*a* is substantially the same as that of a right part of the head 42*b*. In the front-rear direction, positions of the head 42*a* and the head 42*c* are substantially the same, and positions of the head 42*b* and the head 42*d* are substantially the same. Furthermore, in the front-rear direction, the head 42*a* and the head 42*c* are positioned more to a rear side than the head 42*b* and the head 42*d*. That is, the first through fourth heads 42*a*-42*d* are disposed in a zigzag manner so that their right parts or left parts overlap in the front-rear direction. The sensor 43 is positioned on a rear side of the head 42*a*. In the left-right direction, a position of the sensor 43 is substantially the same as that of a right part of the head 42*a*.

The plurality of head modules 40 includes, for example, a first head module 40(1), a second head module 40(2), . . . , an $n^{th}$ head module 40(*n*) (where n is a natural number). The first head module 40(1) is positioned furthest to the left, and the $n^{th}$ head module 40(*n*) is positioned furthest to the right.

Two of the head modules 40 adjacent in the left-right direction have the following positional relationship. A positional relationship of the first head module 40(1) and second head module 40(2) will be described here as an exemplification.

Figure 3:
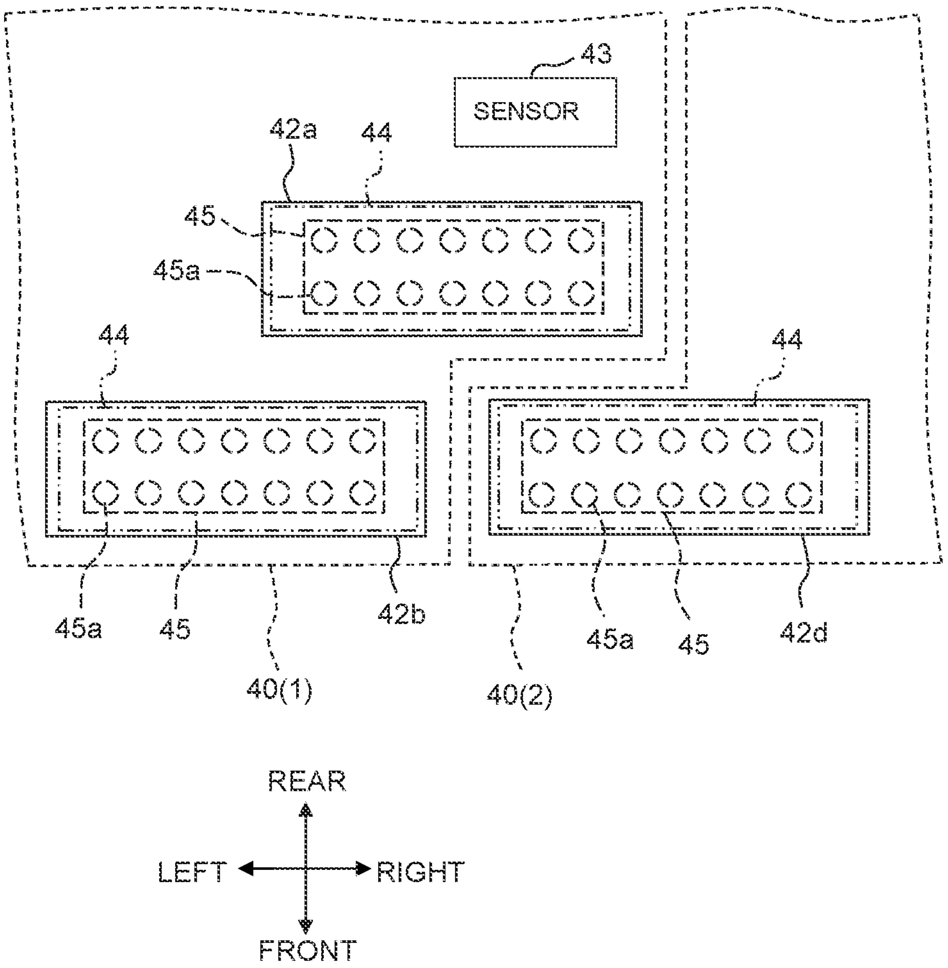
FIG. 3 is a schematic enlarged partial plan view of a first head module and a second head module.

As depicted in FIG. 3, the first head module 40(1) and the second head module 40(2) are disposed in such a manner that the left part of the head 42*d* in the second head module 40(2) is positioned on a front side of the right part of the head 42*a* in the first head module 40(1). That is, in the left-right direction, positions of the sensor 43 and right part of the head 42*a* in the first head module 40(1) and a position of the left part of the head 42*d* in the second head module 40(2) are substantially the same.

Each head module 40 has a lower surface extended in the left-right direction and the front-rear direction. The lower surface configures a nozzle surface 44. The nozzle surface 44 comprises a nozzle region 45. A plurality of nozzle columns extending in the left-right direction is disposed inside the nozzle region 45. Each nozzle column includes a plurality of nozzles 45*a* aligned in the left-right direction.

In the first head module 40(1), a position of a right part of the nozzle region 45 of the head 42*a* in the left-right direction and position of the sensor 43 in the left-right direction are substantially the same. Moreover, in the first head module 40(1), the position of the right part of the nozzle region 45 of the head 42*a* in the left-right direction and position of a left part of the nozzle region 45 of the head 42*d* in the second head module (2) in the left-right direction are substantially the same. That is, in the front-rear direction, the right part of the nozzle region 45 of the head 42*a* in the first head module 40(1) is positioned between the light-receiving element of the sensor 43 and the left part of the nozzle region 45 of the head 42*d* in the second head module 40(2).

In the left-right direction, a position of a left part of the nozzle region 45 of the head 42*a* in the first head module 40(1) and position of a right part of the nozzle region 45 of the head 42*b* in the first head module 40(1) are substantially the same. The above-mentioned positional relationships hold not only for positional relationships between the first head module 40(1) and second head module 40(2), but also for positional relationships between the $n-1^{th}$ head module 40(*n*−1) and $n^{th}$ head module 40(*n*) (where n is a natural number of 3 or more).

Figure 4:
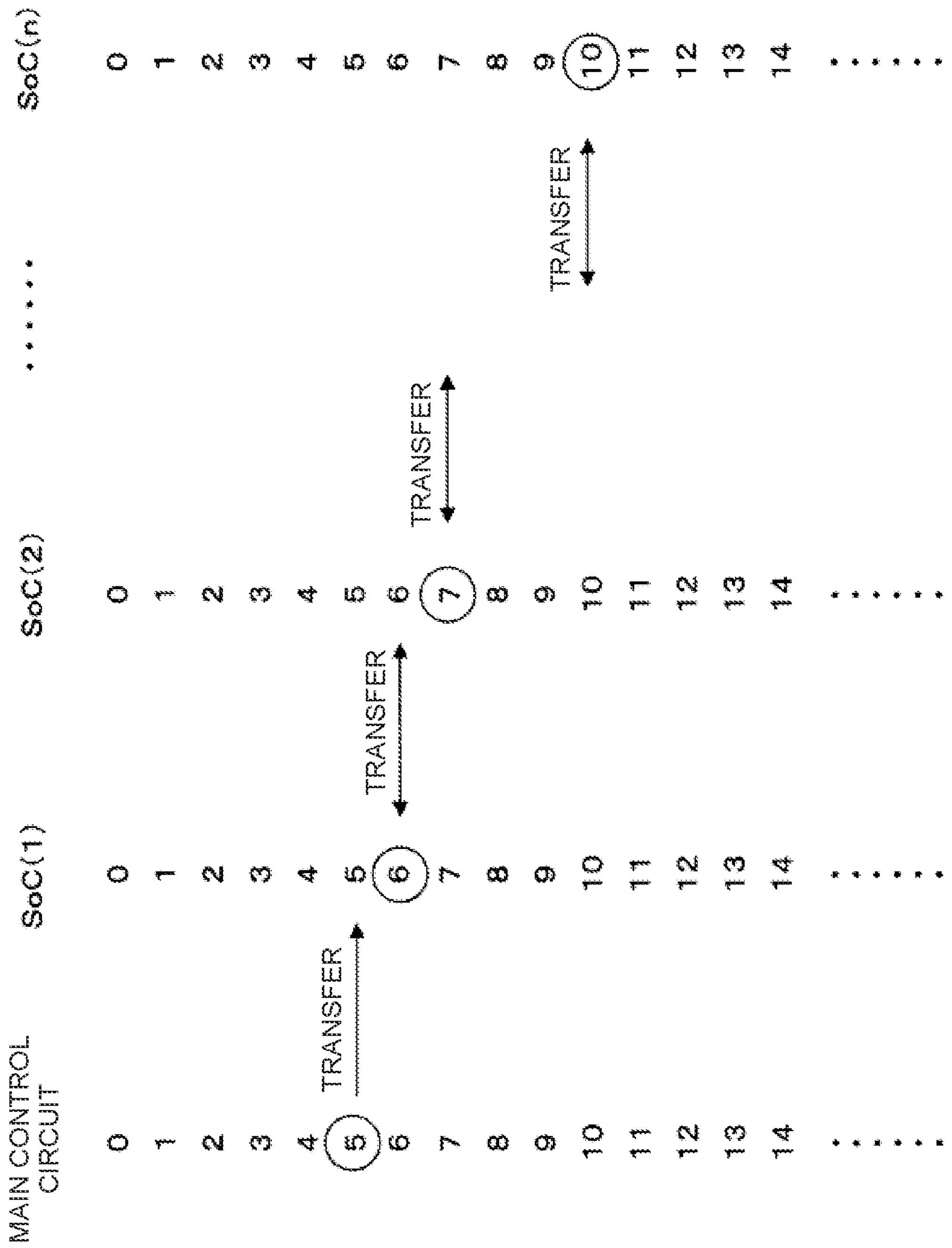
FIG. 4 is an explanatory diagram explaining delay time occurring due to data transfer, between a main control circuit and a plurality of SoCs.

FIG. 4 is an explanatory diagram explaining delay time occurring due to data transfer, between the main control circuit 7*a* and the plurality of SoCs 41. In FIG. 4, the SoC 41 of the $n^{th}$ head module 40(*n*) is written as SoC(n). The sequential numbers depicted in FIG. 4 indicate count values by the timer 7*b* of the main control circuit 7*a* and timers 41*a* of each of the SoCs 41. The timers 7*b*, 41*a* are each synchronized by a resetting signal from outside, for example.

In order to measure delay time occurring due to data transfer, the main control circuit 7*a* transfers test-dedicated synchronization information to SoC(1). At this time, the main control circuit 7*a* associates the count value at time of transfer (for example, "5") with an identifier of the main control circuit 7*a* itself, and transfers these count value and identifier to SoC(1) along with the synchronization information. Hereafter, the count value and identifier will be called count value information, and count value information including the identifier of the main control circuit 7*a* will be written as count value information(0), and count value information including an identifier of SoC(n) written as count value information(n).

SoC(1) transfers the received synchronization information to SoC(2). At this time, SoC(1) transfers count value information(0) and count value information(1) that has associated therein the count value of the timer of SoC(1) itself at time of transfer (for example, "6") and the identifier of SoC(1) itself, to SoC(2) along with the synchronization information.

SoC(2) transfers the received synchronization information to SoC(3). At this time, SoC(2) transfers count value information(0), count value information(1), and count value information(2) that has associated therein the count value of the timer of SoC(2) itself at time of transfer (for example, "7") and the identifier of SoC(2) itself, to SoC(3) along with the synchronization information. In such a way, the synchronization information and each item of count value information are transferred to furthest downstream SoC(n).

Moreover, SoC(n) transfers its own count value information(n) at a time that it received the synchronization information, to SoC(n−1), and SoC(n−1) transfers the count value information(n) and count value information(n−1) to SoC(n−2). In such a way, each item of count value information is transferred to furthest upstream SoC(1).

As a result, each SoC 41 can acquire timepoints that the SoC 41 itself and all of the other SoCs 41 receive the synchronization information. Each SoC 41 can calculate delay time occurring due to transfer, between the SoC 41 itself and the next SoC 41 to which the SoC 41 itself transfers data. Hereafter, this delay time will be called transfer delay time Δt1.

Head modules 40 will be added according to printing width or replaced when their service life has elapsed. Addition or replacement will lead to a new head module 40 being fitted to the ink jet head 4. At this time, a position of the head module 40 will sometimes shift from a designated position due to dimensional error of the fitted head module 40, for example. Shift of fitting position will lead to printing position shifting. In order to prevent shift of printing position, a delay time related to shift of fitting position is measured for each head module 40.

Figure 5A:
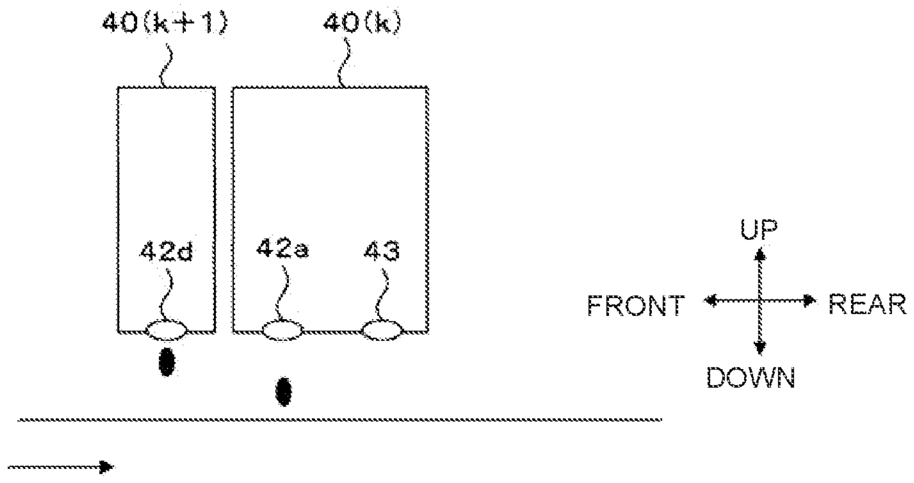
FIGS. 5A to 5C are explanatory diagrams explaining a method for measuring positional-shift delay time between a k$^{th}$ head module and a k+1$^{th}$ head module.
Figure 5B:
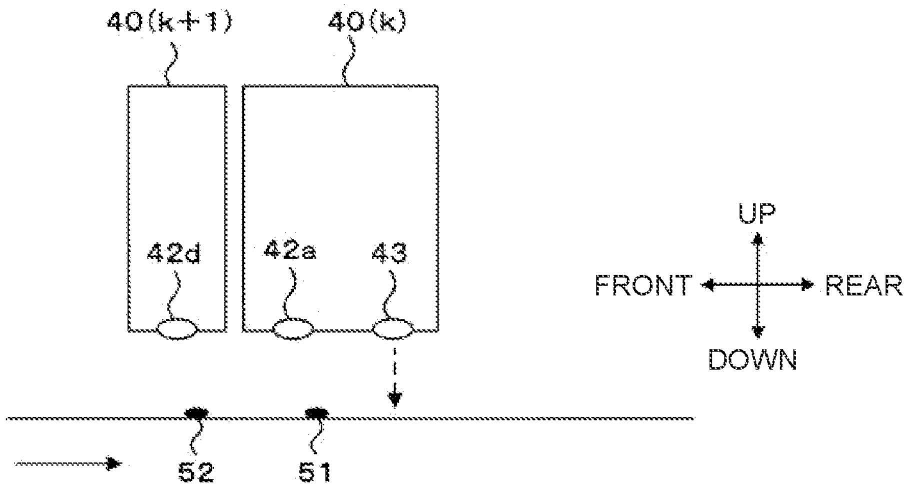
Figure 5C:
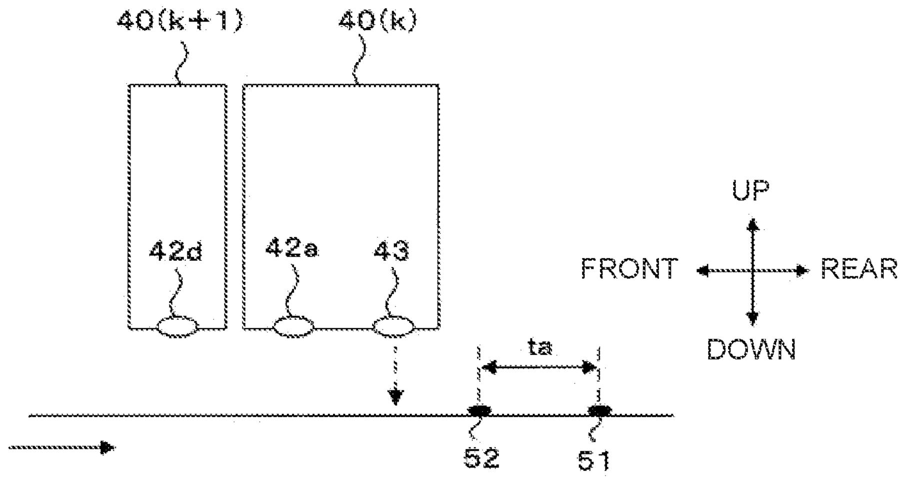

FIGS. 5A to 5C are explanatory diagrams explaining a method for measuring positional-shift delay time between the $k^{th}$ head module 40(*k*) and the $k+1^{th}$ head module 40(*k*+1) (where k is a natural number not exceeding n−1). Upon receiving print-data-for-correction, each SoC 41 controls the heads 42*a*-42*d* to discharge ink onto the recording sheet 100. Each SoC 41 measures delay time, that is, positional-shift delay time occurring due to positional-shift, between two electrically connected head modules 40, based on an image formed on the recording sheet 100. The print-data-for-correction includes correction image information formed and the synchronization information. The synchronization information is information indicating a timepoint when ink is to be discharged from the nozzles 45*a*.

The main control circuit 7*a* transmits the print-data-for-correction to the SoC 41 of the $k^{th}$ head module 40(*k*). The SoC 41 of the $k^{th}$ head module 40(*k*) transfers the received print-data-for-correction to the SoC 41 of the $k+1^{th}$ head module 40(*k*+1). Then, the SoC 41 of the $k^{th}$ head module 40(*k*) controls the heads 42*a*-42*d* to discharge ink and form a first image 51 on the recording sheet 100, based on the received print-data-for-correction. SoC(k+1) of the $k+1^{th}$ head module 40(*k*+1) controls the heads 42*a*-42*d* to discharge ink and form a second image 52 on the recording sheet 100, based on the received print-data-for-correction (refer to FIGS. 5A and 5B).

The print-data-for-correction includes: an instruction causing the $k^{th}$ head module 40(*k*) to discharge ink at a first timepoint t1; and an instruction causing the $k+1^{th}$ head module 40(*k*+1) to discharge ink at a second timepoint t2. The second timepoint t2 is a timepoint later than the first timepoint t1. In other words, the print-data-for-correction includes instructions assuming a discharge timepoint interval of the $k^{th}$ head module 40(*k*) and $k+1^{th}$ head module 40(*k*+1) to be t2−t1. Note that t2−t1 is sufficiently larger than the transfer delay time, and that at the second timepoint t2, reception of print-data-for-correction has been completed for SoC(k) and SoC(k+1).

SoC(k) causes the sensor 43 of the $k^{th}$ head module 40(*k*) to detect the first image 51. When the sensor 43 of the $k^{th}$ head module 40(*k*) has detected the first image 51, SoC(k) starts timing by the timer 41*a*. SoC(k) causes the sensor 43 of the $k^{th}$ head module 40(*k*) to detect the second image 52. When the sensor 43 of the $k^{th}$ head module 40(*k*) has detected the second image 52, SoC(k) finishes timing by the timer 41*a*, and measures time ta (refer to FIG. 5C). SoC(k) calculates a difference of time ta and t2−t1, that is, a positional-shift delay time Δt2 between the $k^{th}$ head module 40(*k*) and $k+1^{th}$ head module 40(*k*+1). Note that time ta corresponds to a distance between the first image 51 and the second image 52.

Figure 6:
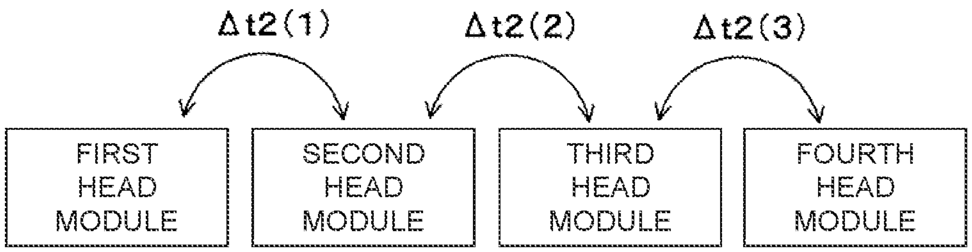
FIG. 6 is an explanatory diagram explaining positional-shift delay times measured in first through fourth head modules.

Next, the method for measuring delay time in the case of k=3 will be described as an example. FIG. 6 is an explanatory diagram explaining positional-shift delay times measured in the first through fourth head modules 40(1)-40(4).

In FIG. 6, Δt2(1) indicates positional-shift delay time between the first head module 40(1) and second head module 40(2), Δt2(2) indicates positional-shift delay time between the second head module 40(2) and third head module 40(3), and Δt2(3) indicates positional-shift delay time between the third head module 40(3) and fourth head module 40(4).

SoC(1), SoC(2), and SoC(3) measure Δt2(1), Δt2(2), and Δt2(3) by the above-mentioned method for measuring positional-shift delay time Δt2 (refer to FIGS. 5A to 5C). SoC(1)-SoC(3) transfer the measured Δt2(1)-Δt2(3) to the SoCs 41 positioned on upstream sides and downstream sides of themselves. SoC(1)-SoC(4) store Δt2(1)-Δt2(3) in their memories 41*b*. Note that since the fourth head module 40(4) is positioned furthest downstream, SoC(4) does not measure positional-shift delay time.

Figure 7:
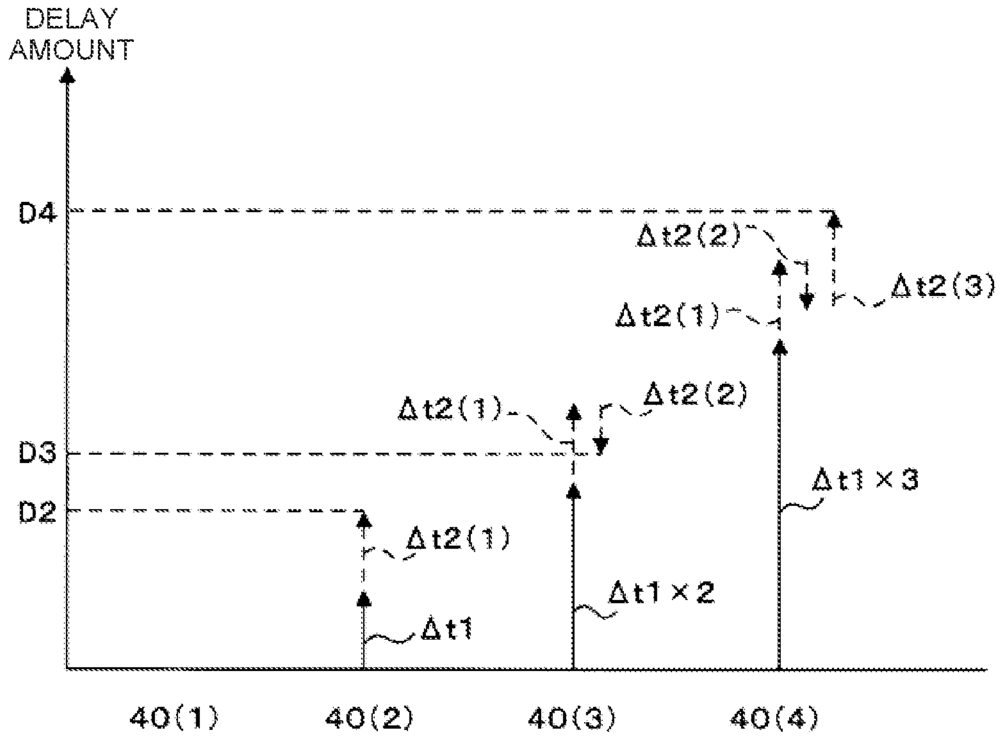
FIG. 7 is a schematic graph explaining delay amounts of the second through fourth head modules made with reference to the first head module.

FIG. 7 is a schematic graph explaining delay amounts of the second through fourth head modules 40(2)-40(4) made with reference to the first head module 40(1). In FIG. 7, the solid line arrows indicate transfer delay times, and the broken line arrows indicate positional-shift delay times. An upwardly-pointing arrow indicates a positive delay amount, and a downwardly-pointing arrow indicates a negative delay amount.

As mentioned above, SoC(1)-SoC(4) each store: the transfer delay times due to transfer between the SoCs 41; and the positional-shift delay times Δt2(1)-Δt2(3). SoC(1)-SoC(4) each find delay amounts of the second through fourth head modules 40(2)-40(4), with reference to the first head module 40(1). Now, it will be assumed that transfer delay time between the first head module 40(1) and second head module 40(2), transfer delay time between the second head module 40(2) and third head module 40(3), and transfer delay time between the third head module 40(3) and fourth head module 40(4) are all Atl.

Delay amount of the second head module 40(2) made with reference to the first head module 40(1) is the sum of: transfer delay time Δt1 between the first head module 40(1) and second head module 40(2); and positional-shift delay time Δt2(1) between the first head module 40(1) and second head module 40(2).

Delay amount of the third head module 40(3) made with reference to the first head module 40(1) is the sum of: transfer delay time Δt1 between the first head module 40(1) and second head module 40(2); transfer delay time Δt1 between the second head module 40(2) and third head module 40(3); positional-shift delay time Δt2(1) between the first head module 40(1) and second head module 40(2); and positional-shift delay time Δt2(2) between the second head module 40(2) and third head module 40(3).

Delay amount of the fourth head module 40(4) made with reference to the first head module 40(1) is the sum of: transfer delay time Δt1 between the first head module 40(1) and second head module 40(2); transfer delay time Δt1 between the second head module 40(2) and third head module 40(3); transfer delay time Δt1 between the third head module 40(3) and fourth head module 40(42); positional-shift delay time Δt2(1) between the first head module 40(1) and second head module 40(2); positional-shift delay time Δt2(2) between the second head module 40(2) and third head module 40(3); and positional-shift delay time Δt2(3) between the third head module 40(3) and fourth head module 40(4).

SoC(1)-SoC(4) each determine the head module 40 having the largest delay amount. Then, SoC(1)-SoC(4) each determine their discharge delay time from timepoint of having received synchronization information, in such a manner that ink will be simultaneously discharged by all of the head modules 40 at a timepoint when ink is dischargeable by the determined head module 40. In the case of FIG. 7, discharge delay times from timepoints of having received synchronization information are determined in such a manner that ink will be simultaneously discharged by the first through fourth head modules 40(1)-40(4) at a timepoint when ink is dischargeable by the fourth head module 40(4).

Note it is not the case that the head module 40 positioned most downstream will always be the head module 40 having the largest delay amount. For example, in the case where positional-shift of fitting position of the fourth head module 40(4) is large, Δt2(3) is a negative value, and delay amount of the fourth head module 40(4) is smaller than delay amount of the third head module 40(3), the third head module 40(3) will be the head module 40 having the largest delay amount.

Figure 8:
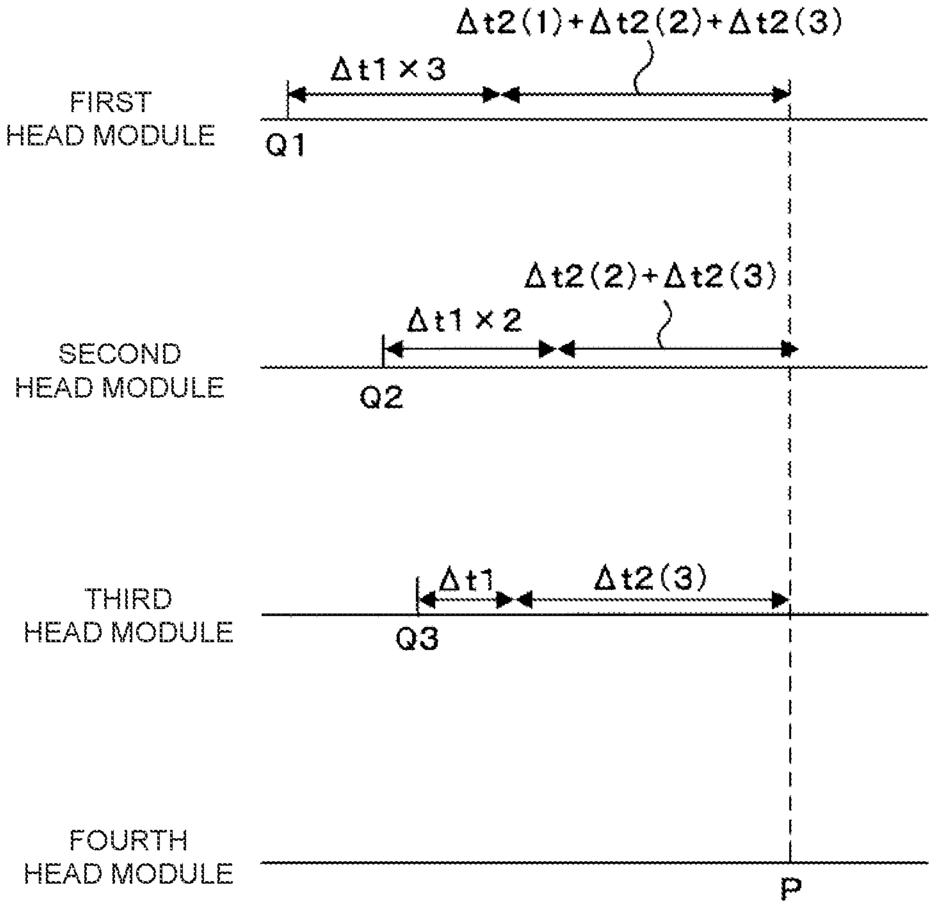
FIG. 8 is a timing chart explaining a method for determining discharge delay times of the first through fourth head modules.

FIG. 8 is a timing chart explaining a method for determining discharge delay times of the first through fourth head modules 40(1)-40(4). In FIG. 8, Q1 indicates a timepoint when the print-data-for-correction has been received by the first head module 40(1). Q2 indicates a timepoint when the print-data-for-correction has been received by the second head module 40(2). Q3 indicates a timepoint when the print-data-for-correction has been received by the third head module 40(3). P indicates a discharge timepoint. Timepoint Q2 is a timepoint later than timepoint Q1. Timepoint Q3 is a timepoint later than timepoint Q2. Timepoint P is a timepoint later than timepoint Q3.

SoC(1) determines Δt1×3+Δt2(1)+Δt2(2)+Δt2(3) as its discharge delay time. Moreover, SoC(1) sets as its discharge timepoint a timepoint delayed by Δt1×3+Δt2(1)+Δt2(2)+Δt2(3) from timepoint Q1. SoC(2) determines Δt1×2+Δt2(2)+Δt2(3) as its discharge delay time. Moreover, SoC(2) sets as its discharge timepoint a timepoint delayed by Δt1×2+Δt2(2)+Δt2(3) from timepoint Q2. SoC(3) determines Δt1+Δt2(3) as its discharge delay time. Moreover, SoC(3) sets as its discharge timepoint a timepoint delayed by Δt1+Δt2(3) from timepoint Q3. By delaying in this way, discharge timepoints of the first through fourth head modules 40(1)-40(4) will all be timepoint P, and ink can be simultaneously discharged at timepoint P.

Note that the above-mentioned method for determining discharge delay time is not limited to the case of the number of head modules 40 being four, and is applicable also in cases where the number of head modules 40 is two or three, or five or more.

Figure 9:
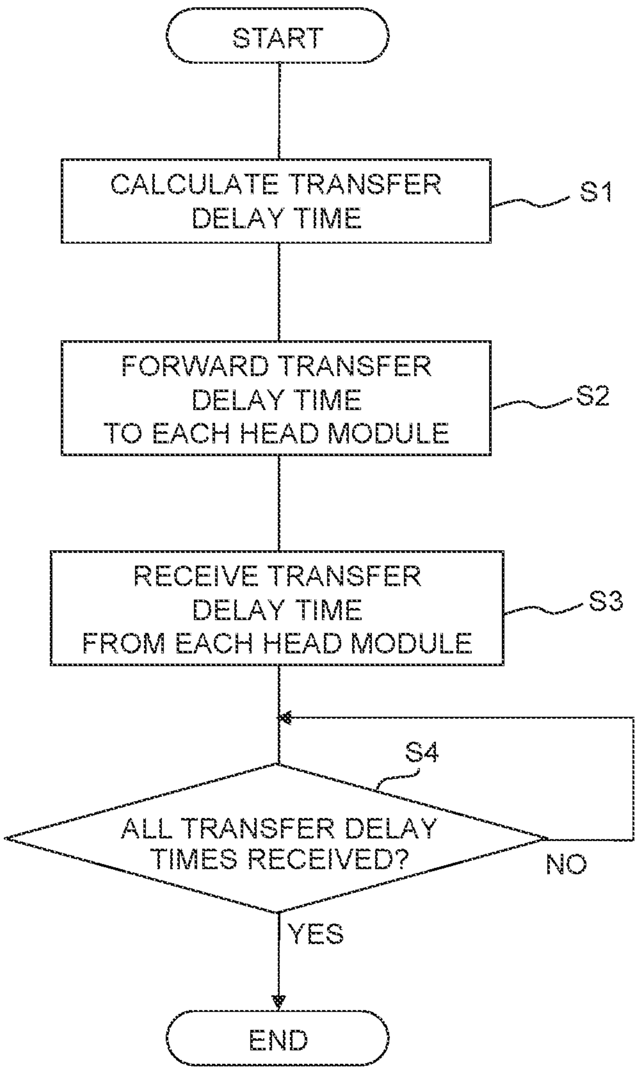
FIG. 9 is a flowchart explaining transfer delay time calculation processing by SoC(k).

FIG. 9 is a flowchart explaining transfer delay time calculation processing by SoC(k). SoC(k) calculates transfer delay time (S1), and transfers the calculated transfer delay time to each head module 40 positioned on an upstream side and downstream side of itself (S2, refer to FIG. 4).

SoC(k) receives a transfer delay time from each of the head modules 40 other than itself (S3), and judges whether a transfer delay time has been received from all of the head modules 40 other than itself, or not (S4). If a transfer delay time has not been received from all of the head modules other than itself (S4: NO), then SoC(k) returns processing to step S4. If a transfer delay time has been received from all of the head modules 40 other than itself (S4: YES), then SoC(k) ends processing.

Figure 10A:
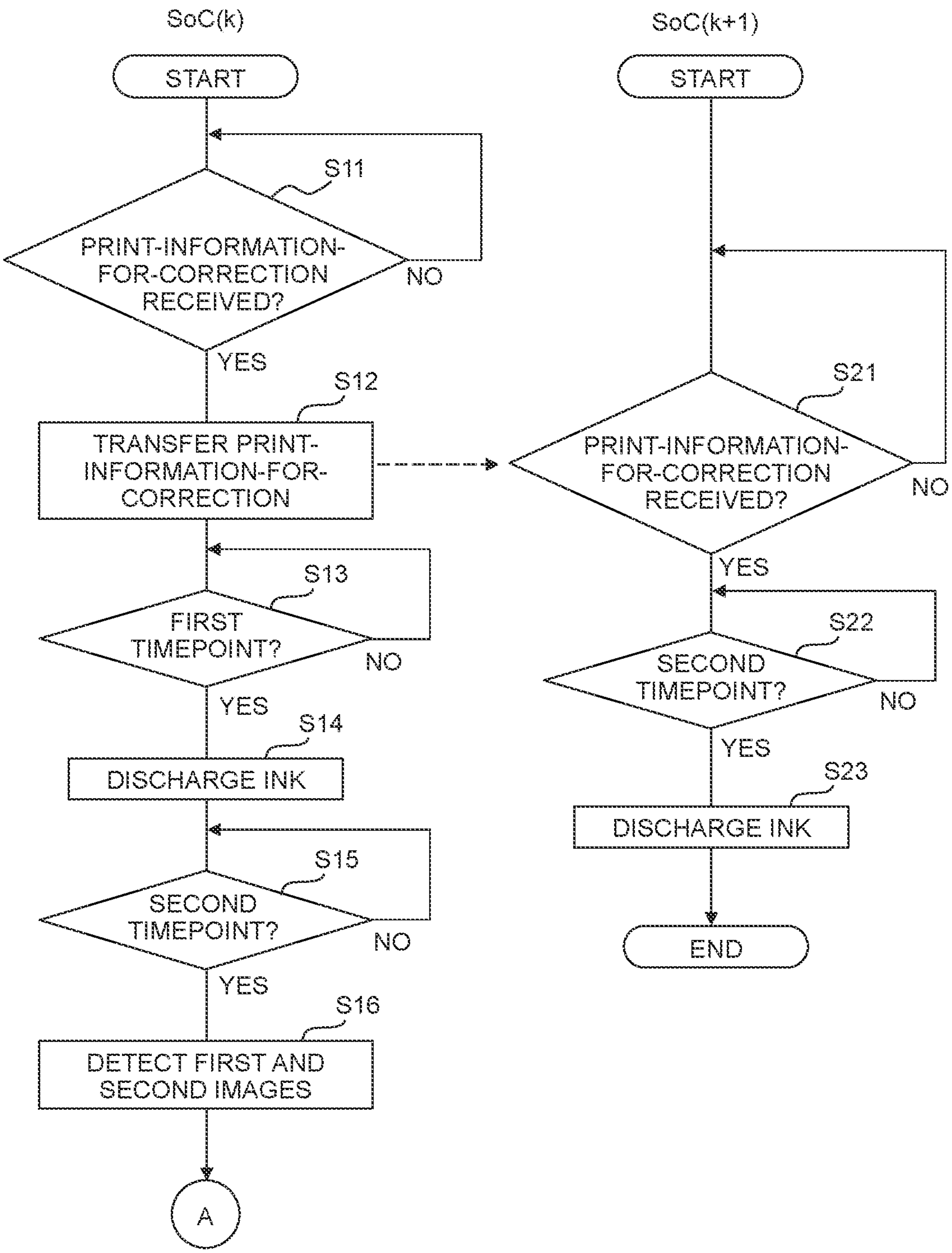
FIGS. 10A and 10B are a flowchart explaining positional-shift delay time calculation processing by SoC(k).
Figure 10B:
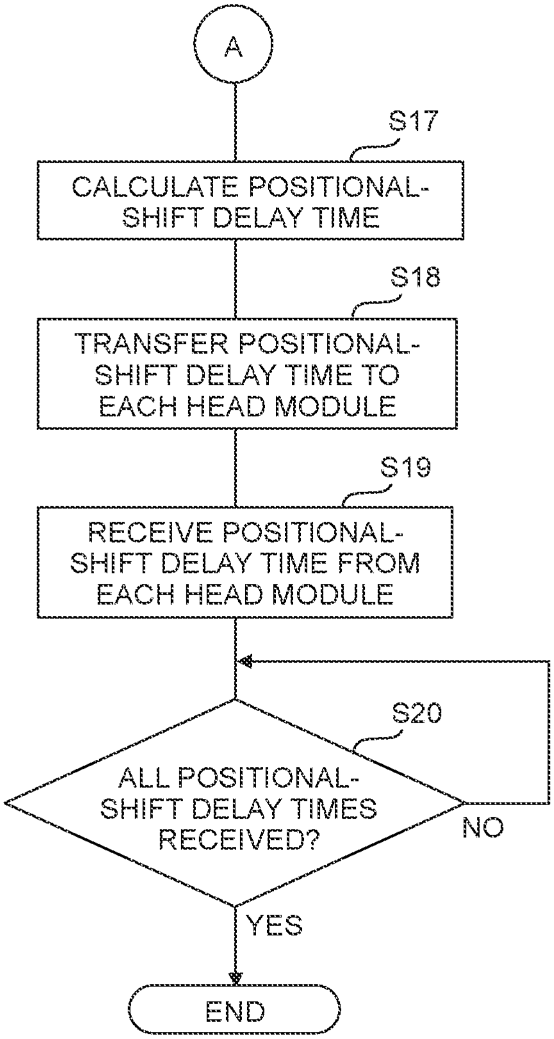

FIG. 10 is a flowchart explaining positional-shift delay time calculation processing by SoC(k) and SoC(k+1). SoC(k) judges whether print-information-for-correction has been received, or not (S11). If print-information-for-correction has not been received (S11: NO), then SoC(k) returns processing to step S11. If print-information-for-correction has been received (S11: YES), then SoC(k) transfers the print-information-for-correction to the head module 40(*k*+1) on its downstream side (S12).

SoC(k) refers to its timer 41*a* and judges whether it is at first timepoint t1, or not (step S13). If it is not at first timepoint t1 (step S13: NO), then SoC(k) returns processing to step S13. If it is at first timepoint t1 (step S13: YES), then SoC(k) discharges ink (S14). Due to discharge of ink, the first image 51 is formed (refer to FIGS. 5A to 5C).

SoC(k) refers to its timer 41*a* and judges whether it is at second timepoint t2, or not (step S15). If it is not at second timepoint t2 (step S15: NO), then SoC(k) returns processing to step S15.

SoC(k+1) judges whether the print-information-for-correction has been received, or not (S21). As mentioned above, this print-information-for-correction is transferred to the head module 40(*k*+1) by SoC(k) in step 512. If the print-information-for-correction has not been received (521: NO), then SoC(k+1) returns processing to step 521. If the print-information-for-correction has been received (S21: YES), then SoC(k+1) refers to its timer 41*a* and judges whether it is at second timepoint t2, or not (step S22). If it is not at second timepoint t2 (step S22: NO), then processing is returned to step S22. If it is at second timepoint t2 (step S22: YES), then SoC(k+1) discharges ink (S23). Due to discharge of ink, the second image 52 is formed (refer to FIGS. 5A to 5C).

If it is at second timepoint t2 (S15: YES), then SoC(k) detects the first image 51 and the second image 52 (S16). SoC(k) calculates positional-shift delay time (S17). Then, SoC(k) transfers the calculated positional-shift delay time to the head modules 40 positioned on an upstream side and downstream side of itself (S18). SoC(k) receives a positional-shift delay time from each of the head modules 40 other than itself (S19). Then, SoC(k) judges whether a positional-shift delay time has been received from all of the head modules 40 other than itself, or not (S20). If a positional-shift delay time has not been received from all of the head modules 40 other than itself (S20: NO), then SoC(k) returns processing to step S20. If a positional-shift delay time has been received from all of the head modules 40 other than itself (S20: YES), then SoC(k) ends processing.

Figure 11:
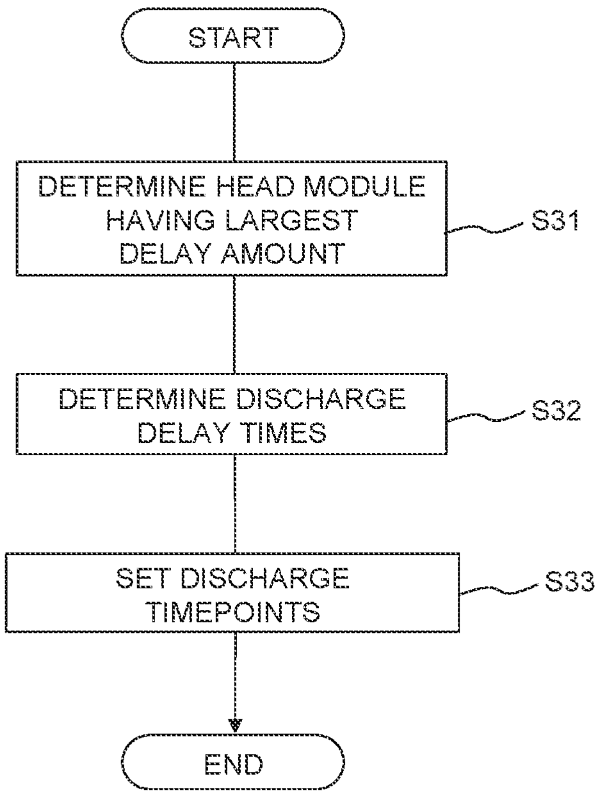
FIG. 11 is a flowchart explaining discharge delay time determination processing by each SoC.

FIG. 11 is a flowchart explaining discharge delay time determination processing by SoC(k). Each SoC 41 determines the head module 40 whose delay amount will be largest, based on each of the transfer delay times and each of the positional-shift delay times that have been acquired in transfer delay time calculation processing and positional-shift delay time calculation processing (S31, refer to FIG. 7). Each SoC 41 determines discharge delay time of each head module 40 with reference to discharge timepoint of the determined head module 40 whose delay amount will be largest (S32). Then, each SoC 41 sets discharge timepoint of each head module 40 (S33, refer to FIG. 8).

In the printer 1 according to the above-described embodiment, one head module 40 comprises one sensor 43. Moreover, in the left-right direction, the position of the light-receiving element of the sensor 43 and the position of the nozzle region 45 where the plurality of nozzles 45*a* of the nozzle surface 44 is formed, are the same. Therefore, each of the plurality of head modules 40 can detect shift of printing position using its own sensor 43. That is, there is no need to provide a dedicated sensor covering an entire printing width in order to detect shift of printing position.

The above-described embodiment is in all respects an exemplification, and should not be considered limiting. The technological features described in each example of execution can be combined with each other, and the scope of the present teaching is intended to include all modifications within the scope of the claims and scope equivalent to the scope of the claims.

What is claimed is:

1. A head module comprising:
- a first control circuit;
- a first head having a plurality of first nozzles configured to discharge liquid, the first head being electrically connected to the first control circuit; and
- a sensor electrically connected to the first control circuit and configured to detect an image formed on a recording medium,
- wherein the first head has a first nozzle surface extended in a first direction and a second direction intersecting with the first direction,
- the first nozzle surface includes a first region in which the first nozzles are formed along the first direction,
- the sensor includes a light-receiving element which has a light-receiving surface extended in the first direction and the second direction, and
- in the first direction, a position of the light-receiving element is same as a position of the first region;
- wherein in the first direction, the position of the light-receiving element is same as a position of a part on one side in the first direction of the first region,
- the head module further comprises a second head having a plurality of second nozzles configured to discharge the liquid, the second head being electrically connected to the first control circuit,
- the second head has a second nozzle surface extended in the first direction and the second direction,
- the second nozzle surface includes a second region in which the second nozzles are formed along the first direction, and
- a position of another part on the other side in the first direction of the first region is same as a position of a part on the one side in the first direction of the second region.

2. A head system comprising two of the head modules according to claim 1,
- wherein the first control circuit of one of the head modules and the first control circuit of the other of the head modules are serially connected,
- the other of the head modules further has a third head having a plurality of third nozzles configured to discharge the liquid, the third head being electrically connected to the first control circuit of the other of the head modules,
- the third head has a third nozzle surface extended in the first direction and the second direction,
- the third nozzle surface includes a third region in which the third nozzles are formed along the first direction, and
- in the first direction, the position of the light-receiving element of the one of the head modules is same as a position of the third region of the other of the head modules.

3. The head system according to claim 2, wherein in the second direction, the first region of the one of the head modules is positioned between the light-receiving element of the one of the head modules and the third region of the other of the head modules.

4. The head system according to claim 3, wherein in the second direction, a part on one side in the first direction of the first region of the one of the head modules is positioned between the light-receiving element of the one of the head modules and a part on the other side in the first direction of the third region of the other of the head modules.

5. The head system according to claim 2, comprising a main control circuit electrically connected to the first control circuit of each of the head modules,
- wherein the main control circuit is configured to transmit print data to the first control circuit of the one of the head modules,
- the first control circuit of the one of the head modules is configured to cause the liquid to be discharged from the first nozzles positioned in the first region of the one of the head modules and transfer the print data to the first control circuit of the other of the head modules, at a first timepoint after receiving the print data,
- the first control circuit of the other of the head modules is configured to cause the liquid to be discharged from the third nozzles positioned in the third region of the other of the head modules, at a second timepoint later than the first timepoint,
- the first control circuit of the one of the head modules is configured to cause the sensor of the one of the head modules to detect a first image and a second image formed on the recording medium, the first image being formed by the liquid that has been discharged from the first nozzles of the one of the head modules, the second image being formed by the liquid that has been discharged from the third nozzles of the other of the head modules,
- the first control circuit of the one of the head modules is configured to execute positional-shift delay time determination processing for determining a positional-shift delay time, based on the first image and the second image that have been detected, the positional-shift delay time being caused by positional-shift of the one and the other of the head modules, and
- the first control circuit of the one of the head modules is configured to:
  - acquire a transfer delay time caused by transfer of the print data; and
  - execute delay time determination processing for determining a discharge delay time, based on the positional-shift delay time and the transfer delay time, the discharge delay time being a time from the receipt of the print data by the first control circuit of the one of the head modules to the discharge of the liquid from the first nozzles of the one of the head modules.

6. The head system according to claim 5, wherein in the positional-shift delay time determination processing, the first control circuit of the one of the head modules is configured to determine the positional-shift delay time, based on a distance between the first image and the second image that have been detected.

7. A liquid discharge apparatus comprising:
- the head system according to claim 2; and
- a conveyor configured to convey the recording medium.

8. A method for determining delay time executed by the head system according to claim 2, the head system comprising a main control circuit electrically connected to the first control circuit of each of the head modules, the method including:
- transmitting print data to the first control circuit of the one of the head modules from the main control circuit;
- causing the liquid to be discharged from the first nozzles positioned in the first region of the one of the head modules and transferring the print data to the first control circuit of the other of the head modules, at a first timepoint after receiving the print data by the first control circuit of the one of the head modules;

causing the liquid to be discharged from the third nozzles positioned in the third region of the other of the head modules, at a second timepoint later than the first timepoint;

causing the sensor of the one of the head modules to detect a first image and a second image formed on the recording medium, the first image being formed by the liquid that has been discharged from the first nozzles of the one of the head modules and the second image being formed by the liquid that has been discharged from the third nozzles of the other of the head modules;

determining a positional-shift delay time by means of the first control circuit of the one of the head modules, based on the first image and the second image that have been detected, the positional-shift delay time being caused by positional-shift of the one and the other of the head modules;

acquiring a transfer delay time caused by transfer of the print data, by means of the first control circuit of the one of the head modules; and determining a discharge delay time by means of the first control circuit of the one of the head modules, based on the positional-shift delay time and the transfer delay time, the discharge delay time being a time from the receipt of the print data by the first control circuit of the one of the head modules to the discharge of the liquid from the first nozzles of the one of the head modules.

9. The method for determining delay time according to claim 8, wherein in a case of determining the positional-shift delay time, the first control circuit of the one of the head modules determines the positional-shift delay time based on a distance between the first image and the second image that have been detected.

10. A liquid discharge apparatus comprising:

the head module according to claim 1; and a conveyor configured to convey the recording medium.

11. A head system comprising a plurality of head modules, wherein each of the head modules comprises:

a control circuit;

a first head electrically connected to the control circuit and having a plurality of first nozzles configured to discharge liquid;

a second head electrically connected to the control circuit and having a plurality of second nozzles configured to discharge the liquid; and a sensor electrically connected to the control circuit and configured to detect an image formed on a recording medium, for each of the head modules, the first head has a first nozzle surface extended in a first direction and a second direction intersecting with the first direction, the first nozzle surface includes a first region in which the first nozzles are formed along the first direction, the sensor includes a light-receiving element which has a light-receiving surface extended in the first direction and the second direction, in the first direction, a position of the light-receiving element is same as a position of the first region, the second head has a second nozzle surface extended in the first direction and the second direction, the second nozzle surface includes a second region in which the second nozzles are formed along the first direction, in the first direction, the position of the light-receiving element is different from a position of the second region, control circuits included in the head modules respectively are serially connected, an adjacent two of the head modules whose control circuits have been serially connected are a $k^{th}$ head module and a $k+1^{th}$ head module (where k is a natural number), the $k+1^{th}$ head module further has a third head having a plurality of third nozzles configured to discharge the liquid, the third head being electrically connected to the control circuit of the $k+1^{th}$ head module, the third head has a third nozzle surface extended in the first direction and the second direction, the third nozzle surface includes a third region in which the third nozzles are formed along the first direction, in the first direction, a position of the third region of the $k+1^{th}$ head module is same as a position of the first region of the $k^{th}$ head module, the control circuit of the $k^{th}$ head module is configured to receive print data, and, at a first timepoint after receiving the print data, cause the liquid to be discharged from the first nozzles positioned in the first region of the $k^{th}$ head module and transfer the print data to the control circuit of the $k+1^{th}$ head module, the control circuit of the $k+1^{th}$ head module is configured to cause the liquid to be discharged from the third nozzles positioned in the third region of the $k+1^{th}$ head module, at a second timepoint later than the first timepoint, the control circuit of the $k^{th}$ head module is configured to cause the sensor of the $k^{th}$ head module to detect a first image and a second image formed on the recording medium, the first image being formed by the liquid that has been discharged from the first nozzles of the $k^{th}$ head module and the second image being formed by the liquid that has been discharged from the third nozzles of the $k+1^{th}$ head module, and the control circuit of the $k^{th}$ head module is configured to:

calculate a positional-shift delay time caused by positional-shift of the $k^{th}$ head module and $k+1^{th}$ head module, based on the first image and the second image that have been detected, transmit the positional-shift delay time that has been calculated to the control circuit of each of the head modules other than the $k^{th}$ head module, receive the positional-shift delay time that has been calculated by the control circuit of each of the head modules other than the $k^{th}$ head module, from the control circuit of each of the head modules other than the $k^{th}$ head module, acquire a transfer delay time caused by transfer of the print data, and determine a discharge delay time from the receipt of the print data by the control circuit of the $k^{th}$ head module to the discharge of the liquid from the first nozzles of the $k^{th}$ head module, based on the positional-shift delay time and the transfer delay time.

12. A liquid discharge apparatus comprising:

the head system according to claim 11; and a conveyor configured to convey the recording medium.

13. A method for determining delay time of a head system having a plurality of head modules, each of the head modules comprising:

a control circuit;

a first head electrically connected to the control circuit and having a plurality of first nozzles configured to discharge liquid;

a second head electrically connected to the control circuit and having a plurality of second nozzles configured to discharge the liquid; and a sensor electrically connected to the control circuit and configured to detect an image formed on a recording medium, the first head having a first nozzle surface extended in a first direction and a second direction intersecting with the first direction, the first nozzle surface including a first region in which the first nozzles are formed along the first direction, the sensor including a light-receiving element which has a light-receiving surface extended in the first direction and the second direction, in the first direction, a position of the light-receiving element being same as a position of the first region, the second head having a second nozzle surface extended in the first direction and the second direction, the second nozzle surface including a second region in which the second nozzles are formed along the first direction, in the first direction, the position of the light-receiving element being different from a position of the second region, control circuits included in the head modules respectively being serially connected, an adjacent two of the head modules whose control circuits have been serially connected being a $k^{th}$ head module and a $k+1^{th}$ head module (where k is a natural number), the $k+1^{th}$ head module further has a third head having a plurality of third nozzles configured to discharge the liquid, the third head being electrically connected to the control circuit of the $k+1^{th}$ head module, the third head has a third nozzle surface extended in the first direction and the second direction, the third nozzle surface includes a third region in which the third nozzles are formed along the first direction, in the first direction, a position of the third region of the $k+1^{th}$ head module being same as the position of the first region of the $k^{th}$ head module, being the same, the method including:

causing the liquid to be discharged from the first nozzles in the first region of the $k^{th}$ head module and transferring print data from the control circuit of the $k^{th}$ head module to the control circuit of the $k+1^{th}$ head module, at a first timepoint after receiving the print data by the control circuit of the $k^{th}$ head module;

causing the liquid to be discharged from the third nozzles in the third region of the $k+1^{th}$ head module, at a second timepoint later than the first timepoint;

causing the sensor of the $k^{th}$ head module to detect a first image and a second image formed on the recording medium, the first image being formed by the liquid that has been discharged from the first nozzles of the $k^{th}$ head module and the second image being formed by the liquid that has been discharged from the third nozzles of the $k+1^{th}$ head module;

calculating a positional-shift delay time based on the first image and the second image that have been detected, by means of the control circuit of the $k^{th}$ head module, the positional-shift delay time being caused by positional-shift of the $k^{th}$ head module and $k+1^{th}$ head module;

transmitting the positional-shift delay time that has been calculated to the control circuit of each of the head modules other than the $k^{th}$ head module;

receiving the positional-shift delay time that has been calculated by the control circuit of each of the head modules other than the $k^{th}$ head module, from the control circuit of each of the head modules other than the $k^{th}$ head module;

acquiring a transfer delay time caused by transfer of the print data; and determining a discharge delay time based on the positional-shift delay time and the transfer delay time, the discharge delay time being a time from the receipt of the print data by the control circuit of the $k^{th}$ head module to the discharge of the liquid from the first nozzles of the $k^{th}$ head module.

* * * * *